US011614317B2

(12) United States Patent
Cummer et al.

(10) Patent No.: US 11,614,317 B2
(45) Date of Patent: Mar. 28, 2023

(54) METHODS PROVIDING ENHANCED MATERIAL THICKNESS SENSING WITH CAPACITIVE SENSORS USING INDUCTANCE-GENERATED RESONANCE AND RELATED DEVICES

(71) Applicants: Tyrata, Inc., Durham, NC (US); Duke University, Durham, NC (US)

(72) Inventors: Steven Cummer, Chapel Hill, NC (US); Joseph Batton Andrews, Durham, NC (US); Aaron Daniel Franklin, Cary, NC (US); David Alan Koester, Burlington, NC (US); James Barton Summers, III, Raleigh, NC (US)

(73) Assignees: Tyrata, Inc., Durham, NC (US); Duke University, Durham, NC (US)

( * ) Notice: Subject to any disclaimer, the term of this patent is extended or adjusted under 35 U.S.C. 154(b) by 270 days.

(21) Appl. No.: 16/907,043

(22) Filed: Jun. 19, 2020

(65) Prior Publication Data
US 2020/0400420 A1 Dec. 24, 2020

Related U.S. Application Data

(60) Provisional application No. 62/864,821, filed on Jun. 21, 2019.

(51) Int. Cl.
*G01B 7/06* (2006.01)
*B60R 16/023* (2006.01)
(Continued)

(52) U.S. Cl.
CPC .............. *G01B 7/087* (2013.01); *B60C 19/00* (2013.01); *B60C 25/007* (2013.01);
(Continued)

(58) Field of Classification Search
CPC ....................................................... G01B 7/087
See application file for complete search history.

(56) References Cited

U.S. PATENT DOCUMENTS 4,847,556 A 7/1989 Langley
5,942,893 A 8/1999 Terpay
(Continued)

FOREIGN PATENT DOCUMENTS

CN 202641277 U 1/2013
CN 102745025 B 9/2014
(Continued)

*Primary Examiner* — Michael A Berns
(74) *Attorney, Agent, or Firm* — Sage Patent Group

(57) ABSTRACT

Methods of measuring a thickness of a material are disclosed. An oscillating signal at a measurement frequency is applied to a circuit including an inductive component and a capacitive component provided using a pair of capacitive sensor electrodes adjacent the material. The measurement frequency is less than a resonant frequency of the circuit, and the resonant frequency is based on the inductive component and the capacitive component. Information regarding a value of a measured parameter is generated based on applying the oscillating signal at the measurement frequency to the circuit. A value of the measured parameter is related to the thickness of the material.

20 Claims, 12 Drawing Sheets

(51) Int. Cl.
B60C 25/00 (2006.01)
B60C 19/00 (2006.01)
B60C 25/05 (2006.01)

(52) U.S. Cl.
CPC ........ B60R 16/023 (2013.01); B60C 25/0551 (2013.01); B60C 2019/004 (2013.01)

(56) References Cited

U.S. PATENT DOCUMENTS

| | | | |
|---|---|---|---|
| 6,883,962 | B2 | 4/2005 | Kurata |
| 6,959,592 | B2 | 11/2005 | Caretta |
| 6,963,273 | B2 | 11/2005 | O'brien et al. |
| 7,404,319 | B2 | 7/2008 | Poulbot et al. |
| 7,578,180 | B2 * | 8/2009 | Lionetti .................. G01B 7/26 |
| | | | 73/146 |
| 7,814,781 | B2 | 10/2010 | Jongsma et al. |
| 8,868,291 | B2 | 10/2014 | Mian et al. |
| 9,029,779 | B2 | 5/2015 | Estor et al. |
| 9,085,205 | B2 | 7/2015 | Son |
| 9,395,275 | B2 | 7/2016 | Boffa et al. |
| 9,797,703 | B2 | 10/2017 | Andrews et al. |
| 10,068,322 | B2 | 9/2018 | O'connor et al. |
| 10,113,855 | B2 | 10/2018 | Ledoux et al. |
| 10,876,826 | B2 * | 12/2020 | Ledoux ................... G01B 7/26 |
| 11,060,841 | B2 * | 7/2021 | Andrews ............... B60C 25/007 |
| 2009/0000370 | A1 | 1/2009 | Lionetti et al. |
| 2009/0222165 | A1 | 9/2009 | Krause et al. |
| 2013/0311130 | A1 | 11/2013 | Horton et al. |
| 2014/0333329 | A1 * | 11/2014 | Jeong .................... G01B 7/085 |
| | | | 361/748 |
| 2016/0161243 | A1 | 6/2016 | Ledoux et al. |
| 2017/0124784 | A1 | 5/2017 | Wittmann et al. |
| 2017/0301103 | A1 | 10/2017 | Gonzaga et al. |
| 2017/0307349 | A1 | 10/2017 | Andrews et al. |
| 2017/0343337 | A1 | 11/2017 | Müller et al. |
| 2020/0400420 | A1 * | 12/2020 | Cummer ............... B60C 25/007 |

FOREIGN PATENT DOCUMENTS

| | | |
|---|---|---|
| CN | 204632090 U | 9/2015 |
| CN | 105082888 A | 11/2015 |
| CN | 105445043 A | 3/2016 |
| CN | 106248402 A | 12/2016 |
| CN | 106290452 A | 1/2017 |
| CN | 206504877 U | 9/2017 |
| CN | 108088634 A | 5/2018 |
| CN | 207881647 U | 9/2018 |
| CN | 108717027 A | 10/2018 |
| DE | 202014007378 U1 | 11/2014 |
| EP | 1394503 B1 | 8/2009 |
| EP | 3243671 A1 | 11/2017 |
| EP | 3265327 | 10/2018 |
| FR | 2841826 B1 | 4/2005 |
| GB | 2555604 A | 5/2018 |
| JP | 4206952 B2 | 1/2009 |
| JP | 4905167 B2 | 3/2012 |
| JP | 6231302 B2 | 11/2017 |
| JP | 6416769 B2 | 10/2018 |
| KR | 1019990054760 A | 7/1999 |
| KR | 1020000001076 A | 1/2000 |
| KR | 1020050043455 A | 5/2005 |
| KR | 100784278 B1 | 12/2007 |
| KR | 1020100048133 A | 5/2010 |
| KR | 101469714 B1 | 12/2014 |
| KR | 101556354 B1 | 9/2015 |
| KR | 1020150100438 A | 9/2015 |
| KR | 101905127 | 10/2018 |
| TW | M497599 U | 3/2015 |
| TW | 201527141 A | 7/2015 |
| TW | M506723 U | 8/2015 |
| TW | I562909 B | 12/2016 |
| TW | M547490 U | 8/2017 |
| TW | M558440 U | 4/2018 |
| WO | WO 2008061770 A1 | 5/2008 |
| WO | WO 2019/191246 A1 | 10/2019 |
| WO | WO 2019/221879 A1 | 11/2019 |
| WO | WO 2019/241118 A1 | 12/2019 |
| WO | WO 2019/241368 A1 | 12/2019 |
| WO | WO/2020/005863 A1 | 1/2020 |
| WO | WO 2020/086698 A1 | 4/2020 |
| WO | WO 2020/154145 A1 | 7/2020 |

* cited by examiner 18 mm of rubber stacked onto sensor (3 pieces each 6 mm thick)

METHODS PROVIDING ENHANCED MATERIAL THICKNESS SENSING WITH CAPACITIVE SENSORS USING INDUCTANCE-GENERATED RESONANCE AND RELATED DEVICES

CROSS REFERENCE TO RELATED APPLICATION

This application claims the benefit of priority from U.S. Provisional Application No. 62/684,821 filed on Jun. 21, 2019, the disclosure and content of which are incorporated by reference herein in their entirety.

TECHNICAL FIELD

The present disclosure relates generally to tires, and more particularly, to tire sensors and related methods.

BACKGROUND

Currently, tire pressure sensors may be provided in vehicle tires. Such sensors may be used to automatically monitor tire pressure, and a warning (e.g., a warning light) may be provided to the driver when low pressure is detected. Other aspects of the tire, however, may require manual monitoring and failure to adequately monitor such aspects may cause issues relating to safety. Accordingly, improved monitoring of vehicle tires may be desired.

SUMMARY

According to some embodiments of inventive concepts, methods of measuring a thickness of a material are provided. An oscillating signal at a measurement frequency is applied to a circuit including an inductive component and a capacitive component provided using a pair of capacitive sensor electrodes adjacent the material. The measurement frequency is less than a resonant frequency of the circuit, and the resonant frequency is based on the inductive component and the capacitive component. Information regarding a value of a measured parameter is generated based on applying the oscillating signal at the measurement frequency to the circuit, wherein a value of the measured parameter is related to the thickness of the material.

The resonant frequency of the circuit may be determined based on the pair of capacitive sensor electrodes being applied to an initial thickness of the material. For example, the measurement frequency may be determined based on a Full Width at Half Maximum bandwidth of the circuit with the pair of capacitive sensor electrodes applied to the initial thickness of the material.

The measurement frequency may be less than the resonant frequency of the circuit and greater than the resonant frequency of the circuit minus 0.9 times a Full Width at Half Maximum (FWHM) bandwidth of the circuit, with the FWHM bandwidth being determined based on applying the pair of capacitive sensor electrodes to the initial thickness of the material. For example, the measurement frequency may be greater than the resonant frequency of the circuit minus 0.5 times a Full Width at Half Maximum (FWHM) bandwidth of the circuit, or the measurement frequency may be greater than the resonant frequency of the circuit minus 0.1 times a Full Width at Half Maximum (FWHM) bandwidth of the circuit.

The inductive component may be provided using an inductor coupled with at least one of the capacitive sensor electrodes, and the resonant frequency may be determined based on the pair of capacitive sensor electrodes being applied to the initial thickness of the material, and based on the inductor.

The measured parameter may include at least one of a voltage of the circuit, an S11 magnitude of the circuit, an S11 phase of the circuit, an impedance of the circuit, and/or a capacitance of the pair of capacitive sensor electrodes. For example, the measured parameter may include a voltage associated with the pair of capacitive sensor electrodes.

The material may be a tire tread, and the pair of capacitive sensor electrodes may be applied to an inner surface of the tire opposite the tire tread. For example, a thickness of the material may be determined based on the value of the measured parameter, and information regarding the thickness may be wirelessly transmitted over a wireless interface to a receiver. In an alternative, the information regarding the value of the measured parameter may be transmitted over a wireless interface to a receiver. In either case, wirelessly transmission may occur over a wireless Bluetooth interface and/or over a wireless WiFi interface to the receiver, and/or the receiver is in a vehicle coupled with the tire.

Moreover, the value of the measured parameter may be correlated with the thickness of the material, so that the value of the measured parameter changes based on changes in the thickness of the material.

According to some other embodiments of inventive concepts, methods of measuring a thickness of a material are provided using a circuit including an inductive component and a capacitive component provided using a pair of capacitive sensor electrodes adjacent the material. Information regarding a value of a measured parameter is obtained. The measured parameter is determined based on applying an oscillating signal at a measurement frequency to the circuit, the measurement frequency is less than a resonant frequency of the circuit, and the resonant frequency is based on the inductive component and the capacitive component. A thickness of the material is determined based on the value of the measured parameter, and the value of the measured parameter is related to the thickness of the material.

The resonant frequency of the circuit may be determined based on the pair of capacitive sensor electrodes being applied to an initial thickness of the material.

The measurement frequency may be determined based on a Full Width at Half Maximum of the circuit with the pair of capacitive sensor electrodes applied to the initial thickness of the material.

The measurement frequency may be less than the resonant frequency of the circuit and greater than the resonant frequency of the circuit minus 0.9 times a Full Width at Half Maximum (FWHM) bandwidth of the circuit, with the FWHM bandwidth being determined based on applying the pair of capacitive sensor electrodes to the initial thickness of the material. The measurement frequency may be greater than the resonant frequency of the circuit minus 0.5 times a Full Width at Half Maximum (FWHM) bandwidth of the circuit, or the measurement frequency may be greater than the resonant frequency of the circuit minus 0.1 times a Full Width at Half Maximum (FWHM) bandwidth of the circuit.

The inductive component may be provided using an inductor coupled with at least one of the capacitive sensor electrodes, and the resonant frequency may be determined based on the pair of capacitive sensor electrodes being applied to the initial thickness of the material, and based on the inductor.

The measured parameter may include at least one of a voltage of the circuit, an S11 magnitude of the circuit, an S11 phase of the circuit, an impedance of the circuit, and/or a capacitance of the pair of capacitive sensor electrodes. For example, the measured parameter include a voltage associated with the pair of capacitive sensor electrodes.

The material may be a tire tread, and the pair of capacitive sensor electrodes may be applied to an inner surface of the tire opposite the tire tread.

Obtaining the information may include wirelessly receiving the information over a wireless interface. For example, the information may be wirelessly received over a wireless Bluetooth interface and/or over a wireless WiFi interface.

The value of the measured parameter may be correlated with the thickness of the material, so that the value of the measured parameter changes based on changes in the thickness of the material.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
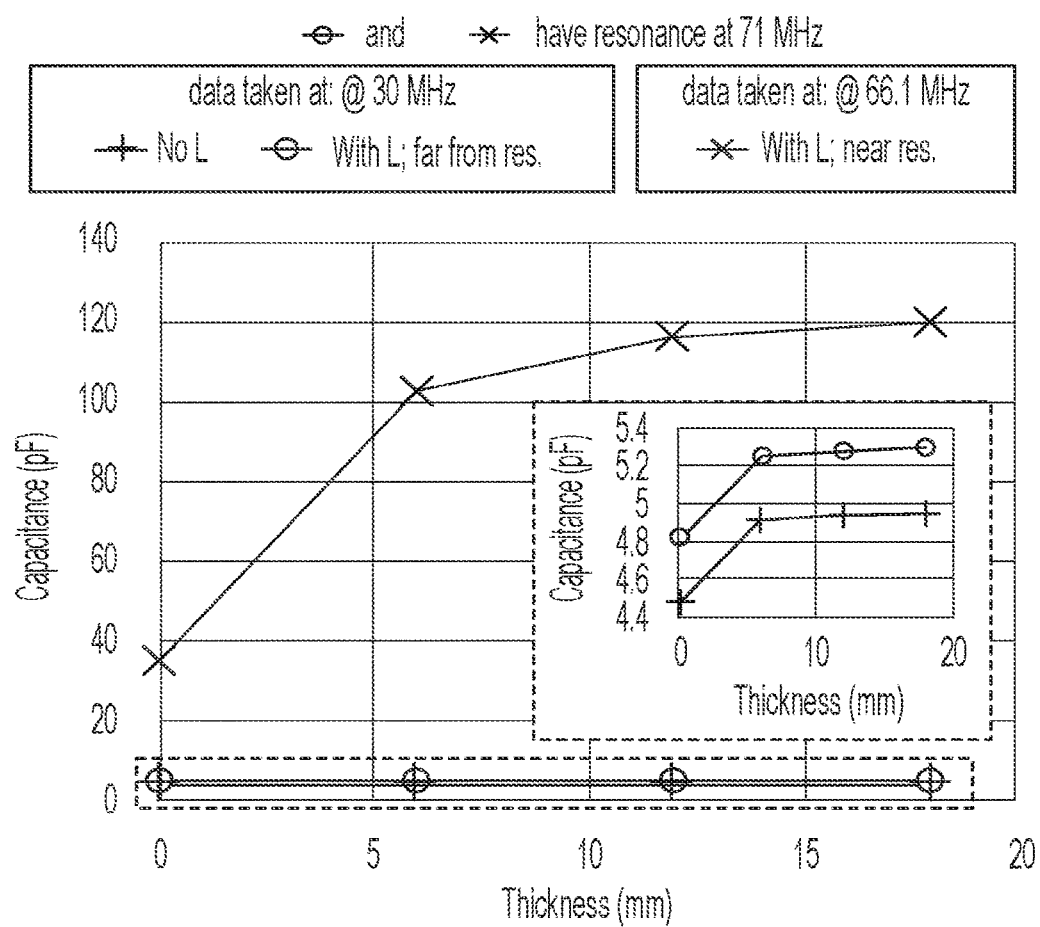
FIG. 1 is a graph illustrating resonances generated using a sensor with a capacitor-inductor circuit to measure thickness according to some embodiments of inventive concepts.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The ability to non-invasively measure the thickness of a complex material (e.g., a tire tread) using an oscillating voltage signal applied between a pair of sensor electrodes located directly beneath the material has been demonstrated (e.g., beneath a tread block on the inside of a tire). U.S. Pat. No. 9,797,703B2, International Application No. PCT/US2018/034872, and U.S. application Ser. No. 16/086,147, for example, discuss thickness measurements. The disclosures of each of U.S. Pat. No. 9,797,703, International Application No. PCT/US2018/034872 (published as WO 2018/226449), and U.S. application Ser. No. 16/086,147 are hereby incorporated herein in their entireties by reference.

According to some embodiments of inventive concepts, methods may be provided to enhance sensitivity of a capacitive material thickness sensor by generating a resonant frequency with the addition of an in-line or parallel inductor and then taking the sensor measurements at a frequency just below this resonance (e.g., about 5% below the resonant frequency). Some sensors may exhibit multiple resonances, yet only one such resonance may yield pronounced sensitivity when operating the sensor at a frequency slightly below it (the resonant frequency). Some embodiments of inventive concepts may pinpoint that this pronounced sensitivity is generated and accessed by introducing an in-line inductance (in series with the capacitive sensor) to bring about a resonance with the desired attributes. Other embodiments of inventive concepts may introduce a parallel inductance (in parallel with the capacitive sensor) to bring about the resonance. As the measurement of the reflected signal (S11) can be correlated with the capacitance between the two sensor electrodes, the sensor can be considered to be a capacitive sensor. As such, some embodiments of inventive concepts may operate by introducing an inductance in series or parallel with the capacitive sensor to generate a resonance at a well-defined and selectable-by-design frequency. This combination of an inductor and capacitor in series (or parallel) provides a circuit system with a resonant frequency $f_r$ defined by the formula:

$$f_r = 1/[\mathrm{sqrt}(LC)],$$

where L is the inductance, C is the capacitance, and sqrt is the square root function. By using a capacitive sensor to measure the thickness of a material at a measurement frequency $f_0$ that is just below that of the inductance-generated resonant frequency $f_r$, a significant enhancement in sensitivity may be provided. Hence, some embodiments of inventive concepts may provide methods to enhance the sensitivity of a capacitance-based material thickness sensor by adding an inductance and monitoring a resulting output signal (e.g., voltage, a magnitude of the S11 detected at the circuit, a phase of the S11 detected at the circuit, impedance, and/or capacitance) at a measurement frequency $f_0$ just below the generated resonant frequency $f_r$; and this signal may change as the thickness of the overlying material (e.g., a tire tread) changes. According to some other embodiments, the capacitive sensor may be used to measure the thickness of the material at a measurement frequency $f_0$ that is just above that of the inductance-generated resonant frequency $f_r$.

Some embodiments of inventive concepts may be provided by adding a 1 µH inductor in series with a capacitive sensor (two planar, square sensor electrodes, 10 mm×10 mm in size each with a 1 mm gap between edges of the two sensor electrodes). Before the inductor was added, the S11 magnitude and capacitance signals showed little/no resonance—data was relatively flat across a frequency range of 1 MHz to 1000 MHz. Upon adding the 1 µH inductor, a resonance at 71 MHz presented in the data, just as expected from the 1/sqrt(LC) relation. Material thickness sensing with this setup was demonstrated using rubber blocks of 6 mm thickness. The graphs of FIG. 1 show the significant enhancement obtained by using this method of measuring thickness at a fixed measurement frequency $f_0$ that is just below the resonant frequency $f_r$ generated by addition of an inductor in series with the capacitive sensor. The data indicated by '+' symbols was obtained prior to adding the in-line inductor and was collected at approximately 30 MHz (data was effectively invariant with frequency). Then, the data indicated by 'o' symbols and the data indicate by 'x' symbols were taken after adding the in-line inductor. The inductor yielded a resonance at 71 MHz and the 'x' symbol data was collected at 66.1 MHz (just below the resonance) while the 'o' symbol data was collected far from the resonance (~30 MHz). By generating the resonance using the in-line inductor, and then taking the capacitance measurement at a measurement frequency $f_0$ just below the resonant frequency $f_r$, the measured capacitance signal may be significantly stronger in magnitude and percent change as the thickness of the overlying rubber material is changed.

Figure 2B:
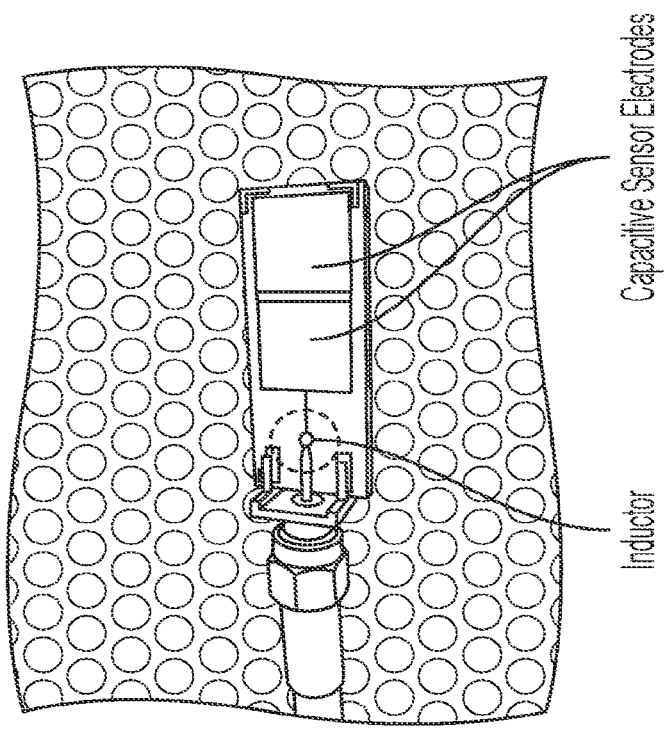
FIGS. 2A and 2B are photographs respectively illustrating sensor structures without an inductor and with an inductor according to some embodiments of inventive concepts.
Figure 2A:
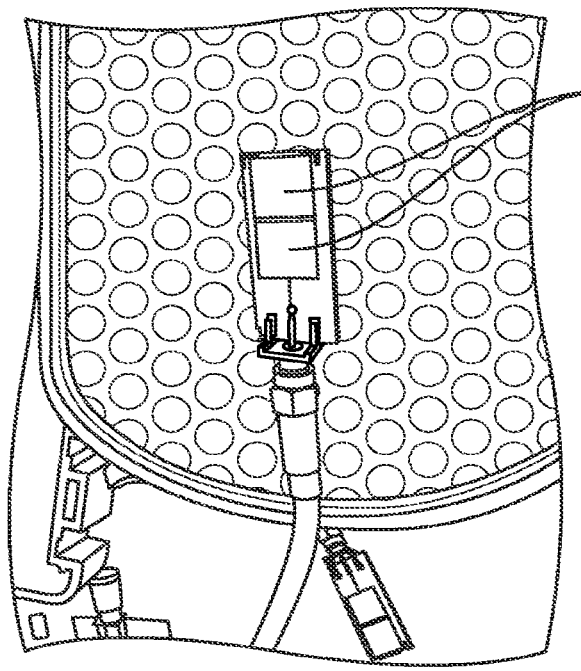

FIGS. 2A and 2B are photographs showing the capacitive material thickness sensor including two conductive sensor electrodes (one signal and one ground). FIG. 2A shows the sensor without any added inductor (L). FIG. 2B shows the same sensor after a 1 µH inductor has been added in series with the capacitive sensor to generate a resonance.

Figure 3A:
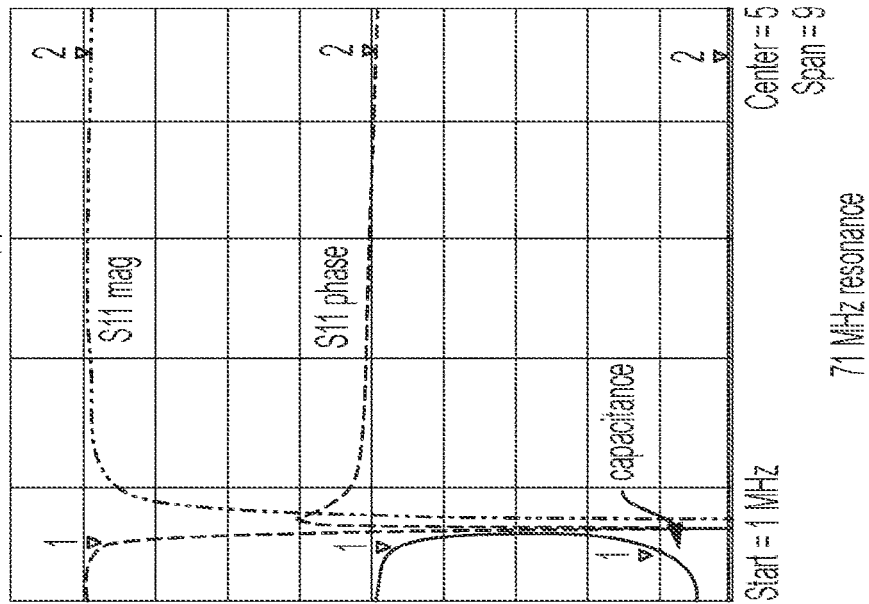
FIGS. 3A and 3B are graphs illustrating S11 magnitude, S11 phase, and capacitance respectively for sensor structures without an inductor and with an inductor according to some embodiments of inventive concepts.
Figure 3B:
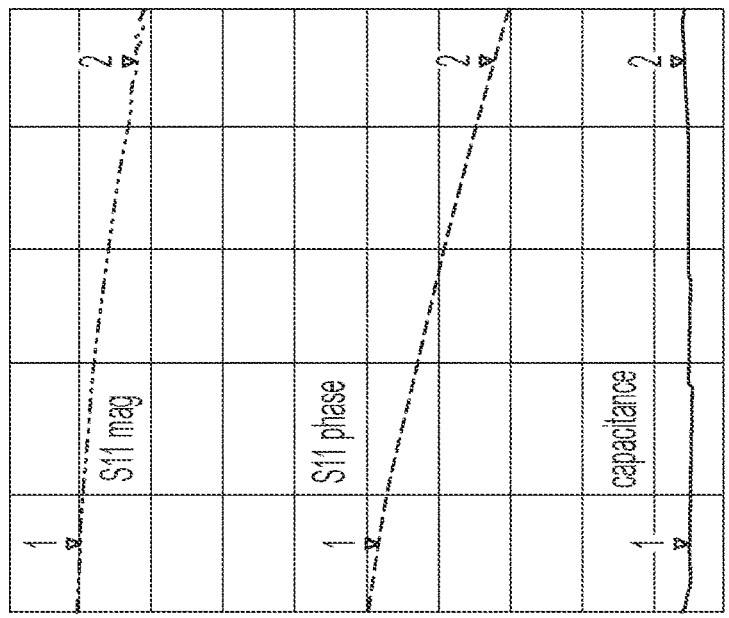

Inductor-generated resonance is illustrated in FIGS. 3A and 3B which are screenshots of the measurement of S11 magnitude, S11 phase, and capacitance from 1 MHz to 500 MHz for the capacitive sensor (with no material on top) before the addition of an in-line inductor (FIG. 3A) and after the addition of an in-line inductor (FIG. 3B), which generated a resonance at 71 MHz that is visible in all three of these measured parameters (i.e., they are interrelated).

Enhanced sensitivity may be provided by measuring the parameter(s) using a measurement frequency $f_0$ just below the resonant frequency $f_r$.

Figure 4A:
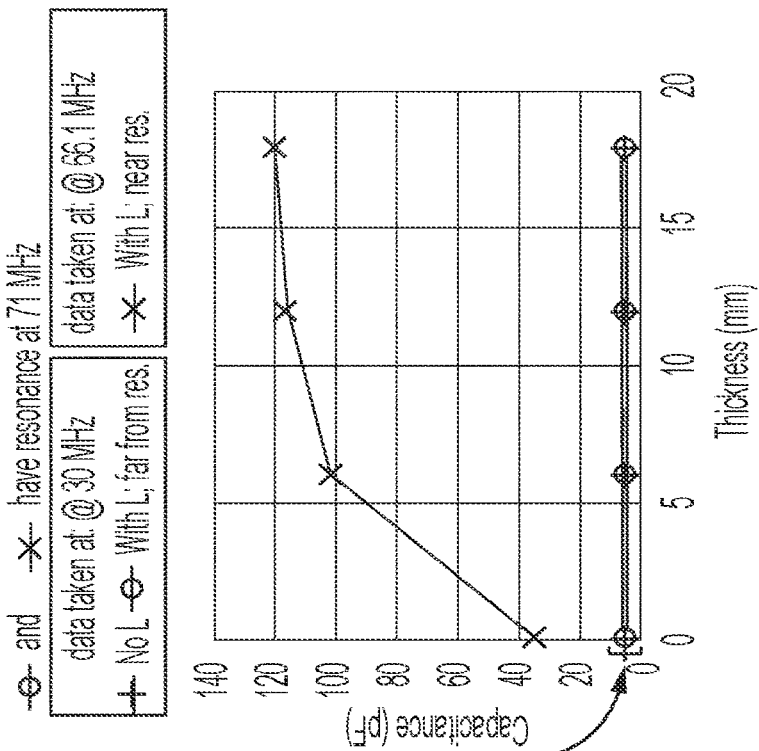
FIGS. 4A and 4B are graphs illustrating capacitive data respectively collected at measurement frequencies of 30 MHz and 66.1 MHz according to some embodiments of inventive concepts.
Figure 4B:
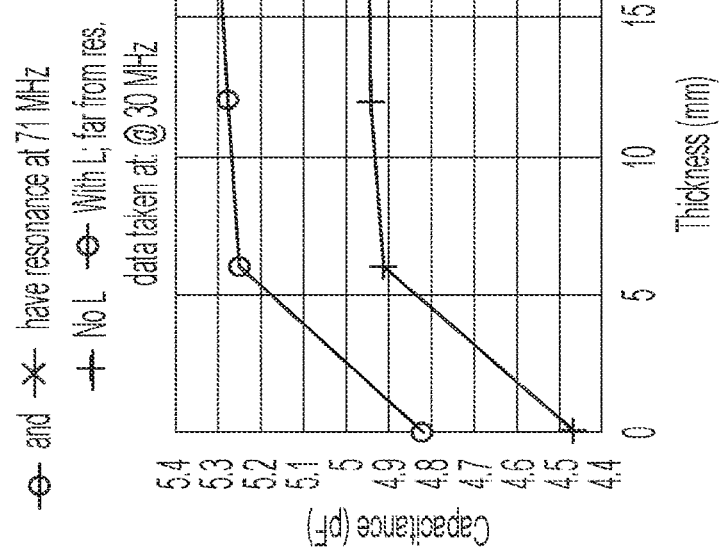
Figure 5:
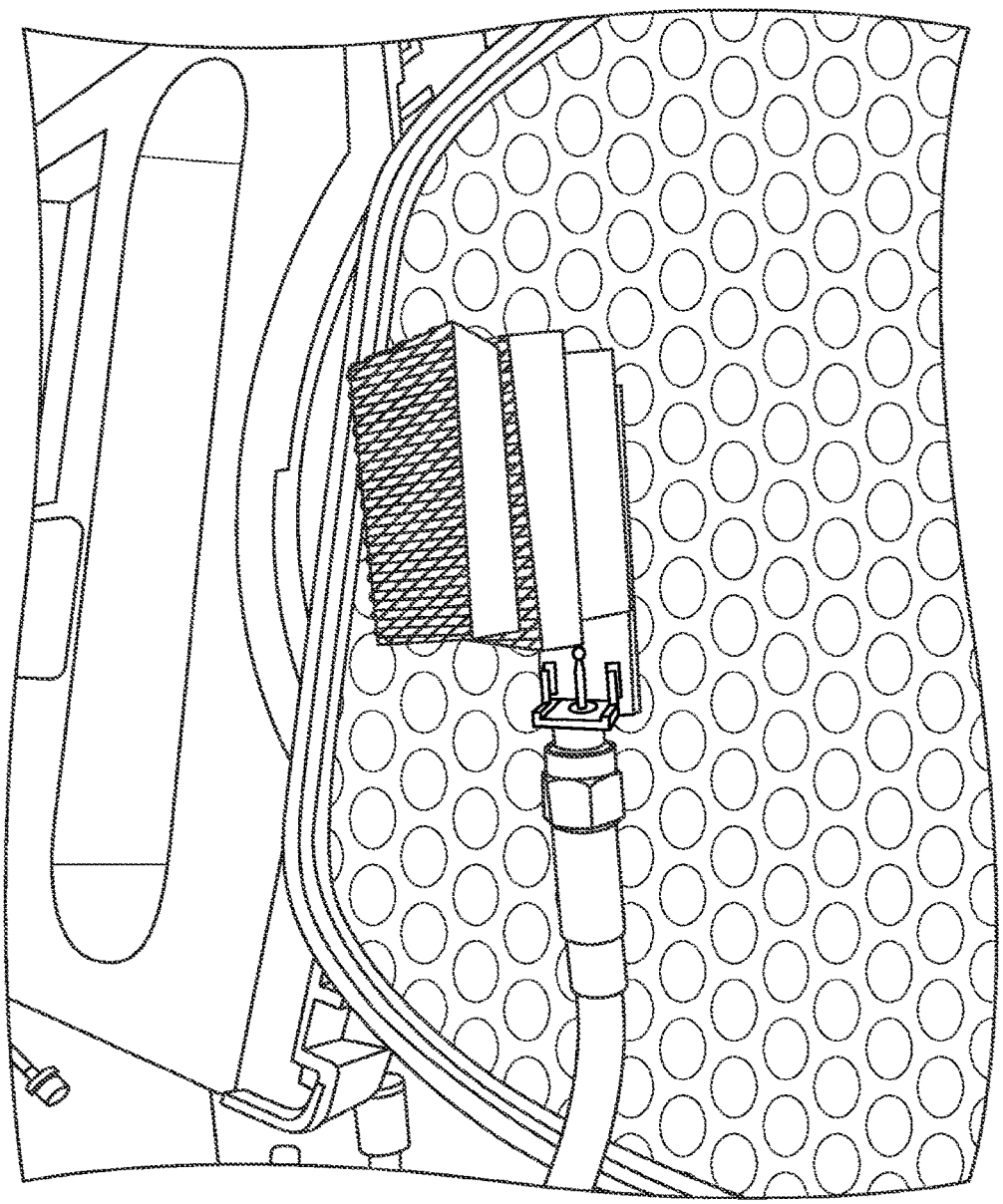
FIG. 5 is a photograph illustrating rubber blocks stacked on a sensor according to some embodiments of inventive concepts.

Plots of FIGS. 4A and 4B show capacitance data collected at a fixed measurement frequency of either 30 MHz in FIG. 4A (far from the resonant frequency) or 66.1 MHz in FIG. 4B (just below the resonant frequency). Data indicated by '+' symbols is from the sensor without the in-line inductor while data indicated by the 'o' symbols and data indicated by 'x' symbols are from sensors with the inductor added and resonant frequency generated at 71 MHz. Measurement just below resonant frequency (at a measurement frequency of 66.1 MHz) yields a 243% change in capacitance from 0 to 18 mm of rubber being detected, whereas operating the sensor far from the resonant frequency (or without an inductor) yields only about an ~10% change in capacitance over the same thickness range. FIG. 5 is a picture illustrating the rubber blocks (three blocks, each 6 mm thick for a total 18 mm thickness) stacked onto the sensor to perform the measurements that produced the data in of FIGS. 4A and 4B.

Figure 6:
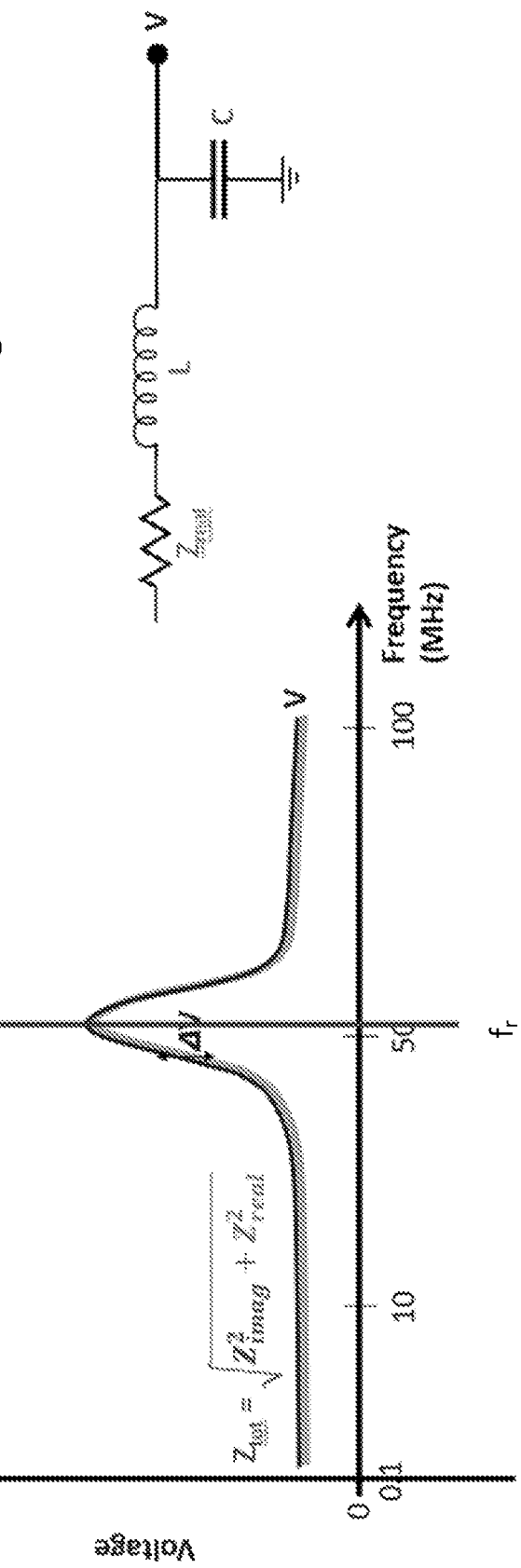
FIG. 6A is a graph illustrating voltage (v) as a function of frequency for the circuit of FIG. 6B according to some embodiments of inventive concepts.

As shown in FIG. 6A, the resonant frequency $f_r$ of the LC circuit of FIG. 6B including the inductor L and the capacitor C (resulting from the two sensor electrodes with the initial thickness of the measured material/tread) may be calculated using the formula:

$$f_r = 1/[\text{sqrt}(LC)],$$

where L=inductance, C=Capacitance. and sqrt is the square root function. In the circuit of FIG. 6B, the inductance may be relatively constant, but the capacitance may change over time based on changes in the thickness of the material being measured (e.g., wear of the tire tread) on the sensor electrodes.

At the initial thickness of the material being measured (and thus at the initial capacitance C), an impedance $Z_{tot}$ of the LC resonator circuit is dependent on the frequency applied to the LC resonator circuit, and a peak of the impedance $Z_{tot}$ occurs at the resonant frequency $f_r$. Accordingly, a voltage V across the capacitor C is dependent on the frequency applied to the LC circuit, and a peak of the voltage V (across the capacitor resulting from the two sensor electrodes) occurs at the resonant frequency $f_r$ as shown in the graph of FIG. 6A. With a change in $Z_{tot}$, a voltage drop across the capacitor C changes.

Figure 7:
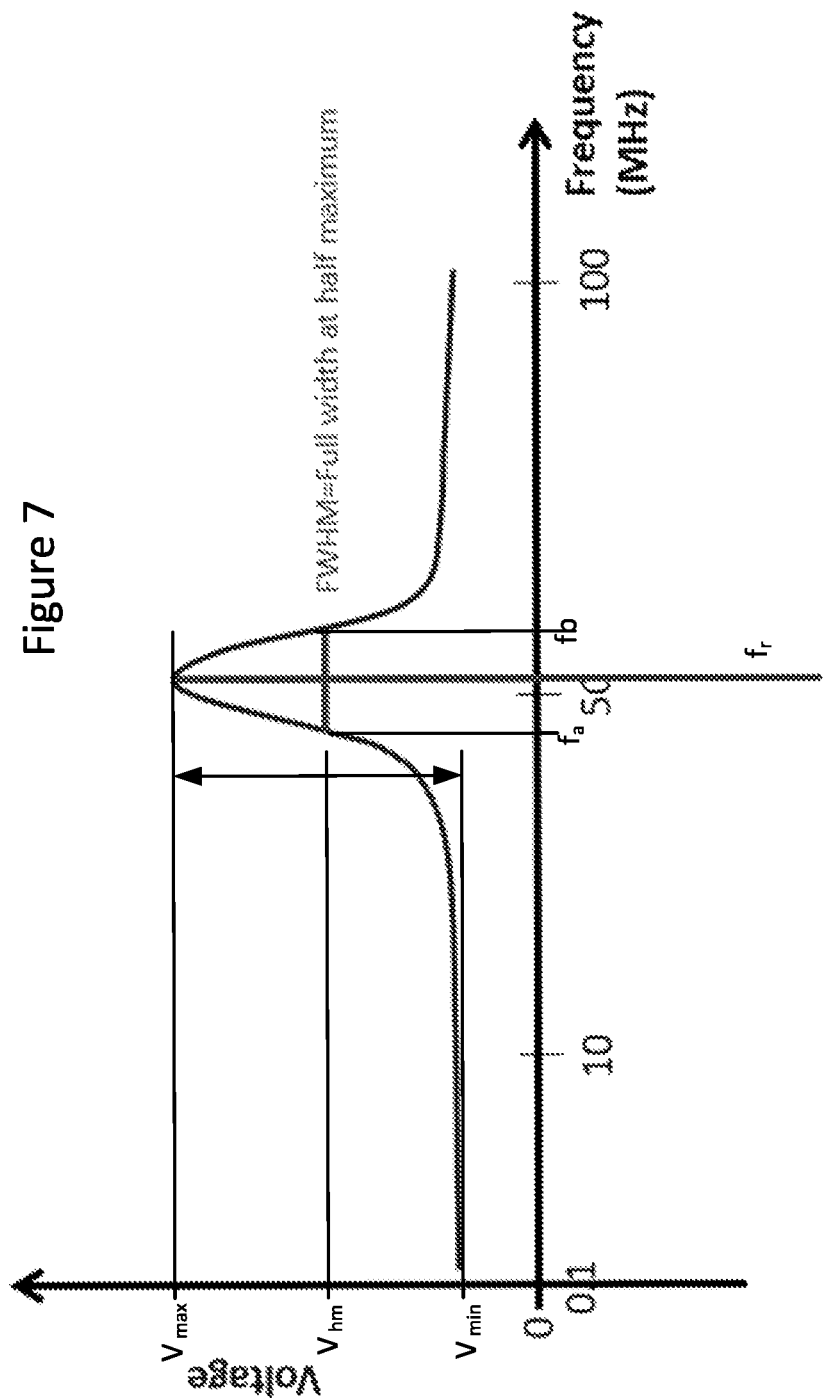
FIG. 7 is a graph illustrating voltage v as a function of frequency with frequencies fa and fb defining a full width at half maximum (FWHM) bandwidth according to some embodiments of inventive concepts.

As shown in FIG. 7, a Full Width at Half Maximum FWHM bandwidth can be determined for the voltage V across the capacitor (resulting from the sensor electrodes mounted adjacent to the measured material) when the measured material (e.g., tire tread) has its initial/greatest thickness. The Full Width at Half Maximum FWHM bandwidth (also referred to as FWHM) can be determined using the formula:

$$\text{FWHM} = 2[\text{sqrt}(2 \ln(2))]\sigma.$$

or approximated as FWHM=2.355σ, where σ is the standard deviation. The FWHM can also be determined based on a magnitude of the half maximum voltage $V_{hm}$ that is half of the distance/voltage between the voltage minimum $V_{min}$ of the graph and the voltage maximum $V_{max}$, or, $$V_{hm} = (V_{max} - V_{min})/2.$$

so that FWHM bandwidth is the difference between the two frequencies $f_a$ and $f_b$, at which $V_{hm}$ occurs (on opposite sides of the resonant frequency $f_r$). Accordingly, the frequencies $f_a$ and $f_b$ may be approximately equidistant from the resonant frequency $f_r$.

Figure 8:
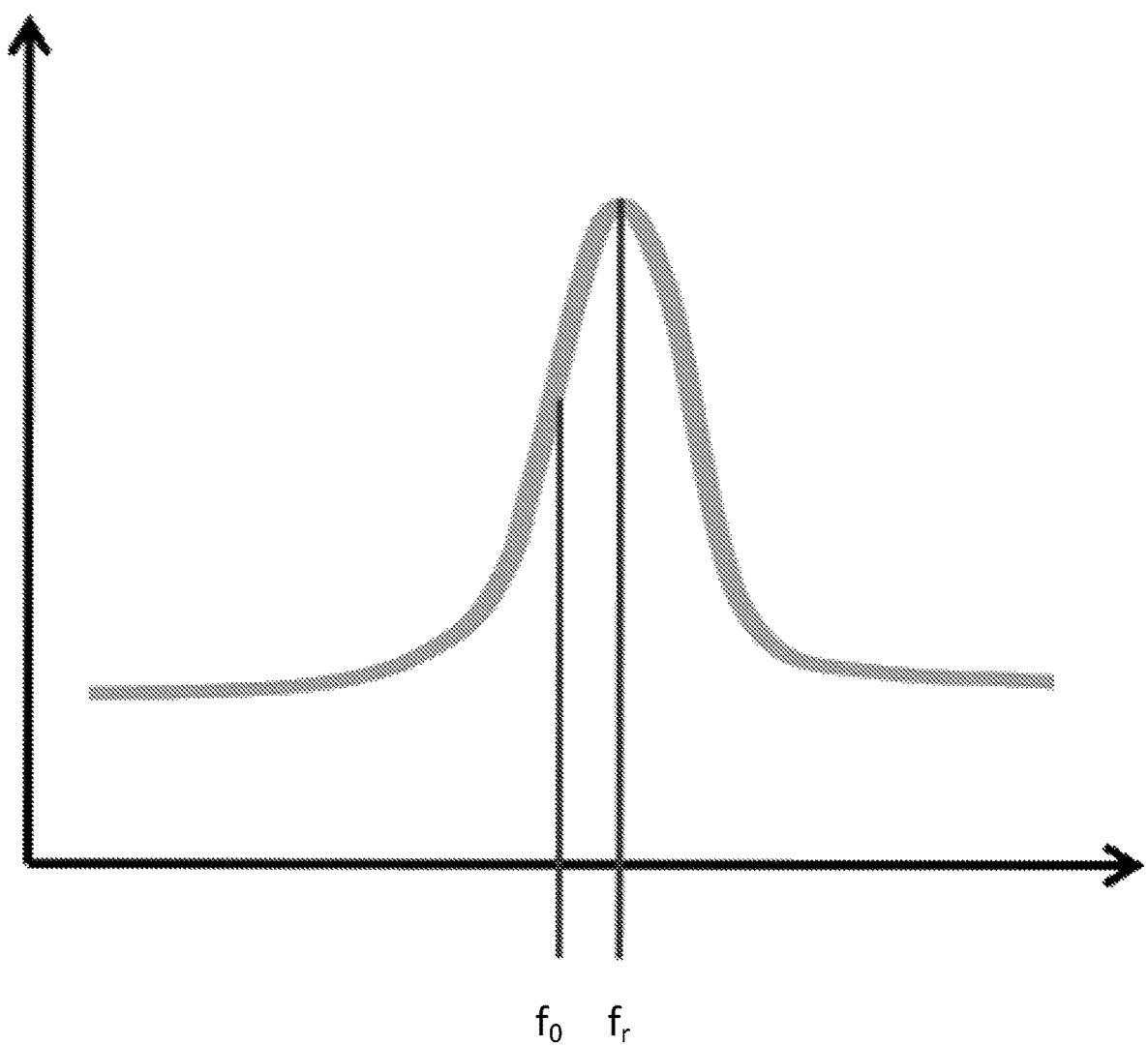
FIG. 8 is a graph illustrating selection of a measurement frequency $f_0$ relative to an initial resonant frequency $f_r$ according to some embodiments of inventive concepts.

Based on the initial resonant frequency $f_r$ of the circuit when the material being measured (e.g., tire tread) is at its greatest thickness, a frequency for measurement $f_0$ can thus be determined where the frequency for measurement is used to determine a changing thickness of the material over time. By selecting the frequency for measurement $f_0$ (also referred to as the measurement frequency) to be slightly less than the initial resonant frequency $f_r$, on the steep (rising) portion of the voltage curve as shown in FIG. 8, a sensitivity of measurement may be increased. By measuring the voltage V (or other measurement parameter such as S11 magnitude, S11 phase, impedance, and/or capacitance) while applying the frequency for measurement $f_0$ to the LC measurement circuit, relatively small changes in the thickness of the material (e.g., tire tread) being measured may result in relatively large changes in the measured voltage V (or other measurement parameter such as S11 magnitude, S11 phase, impedance, and/or capacitance) due to the change in capacitance that results from the change in thickness. In particular, as the thickness of the material (e.g., tire tread) is reduced, the resonant frequency of the circuit may increase (shift to the right in FIG. 8) thereby reducing the voltage V (or increasing the impedance $Z_{tot}$) measured at the measurement frequency $f_0$, and changes in voltage/impedance may be correlated with changes in thickness of the material being measured (e.g., tire tread thickness). Stated in other words, the resonant frequency $f_r$ and the curve of FIG. 8 may shift to the right as the measured thickness is reduced, resulting in significant change in the parameter measured using the constant measurement frequency $f_0$.

The frequency for measurement $f_0$ (also referred to as the measurement frequency) may be selected in different ways as discussed below. For example, the frequency for measurement $f_0$ may be selected with reference to the initial resonant frequency $f_r$, where the capacitive value C used to define the initial resonant frequency $f_r$ is based on the full initial thickness of the material (e.g., tire tread) being measured. According to some embodiments, the frequency for measurement $f_0$ may be determined based on one or more of the following:

$f_0 = f_r - x$, where, $0 < x \leq (0.9)$FWHM,
$0 < x \leq (0.5)$FWHM,
$0 < x \leq (0.1)$FWHM,
$(0.1)$FWHM $\leq x \leq (0.9)$FWHM,
$(0.3)$FWHM $\leq x \leq (0.9)$FWHM.
$(0.5)$FWHM $\leq x \leq (0.9)$FWHM.
$(0.7)$FWHM $\leq x \leq (0.9)$FWHM,
$(0.1)$FWHM $\leq x \leq (0.7)$FWHM,
$(0.1)$FWHM $\leq x \leq (0.5)$FWHM,
$(0.1)$FWHM $\leq x \leq (0.3)$FWHM.
$(0.3)$FWHM $\leq x \leq (0.7)$FWHM,
$(0.4)$FWHM $\leq x \leq (0.6)$FWHM,
$x = (0.5)$FWHM,
$x = (0.9)$FWHM; or $f_0 = f_a$, where, $f_a$ is the frequency resulting in the half maximum voltage $V_{hm}$ of FIG. 7.

Accordingly, multiple points can be referenced on the resonant peak as a selected measurement frequency $f_0$, and the measurement frequency $f_0$ can be referenced to the circuit resonant frequency $f_r$. The capacitance value that defines the resonant frequency $f_r$ may include all the capacitance in the circuit including that contributed by the tire. Examples of $f_0$ may include:

$f_0 = f_r - 0.5$(FWHM); or $f_0 = f_r - 0.9$(FWHM).

According to some other embodiments, by measuring the voltage V (or other measurement parameter such as S11 magnitude, S11 phase, impedance, and/or capacitance) while applying the frequency for measurement $f_0$ that is slightly greater than the resonant frequency $f_r$ to the LC measurement circuit (i.e., $f_0$ is to the right of $f_r$ in FIG. 8), relatively small changes in the thickness of the material (e.g., tire tread) being measured may result in relatively large changes in the measured voltage V (or other measurement parameter such as S11 magnitude, S11 phase, impedance, and/or capacitance) due to the change in capacitance that results from the change in thickness. In particular, as the thickness of the material (e.g., tire tread) is reduced, the resonant frequency of the circuit may increase (shift to the right in FIG. 8) thereby increasing the voltage V (or increasing the impedance Z) measured at the measurement frequency $f_0$, and changes in voltage/impedance may be correlated with changes in thickness of the material being measured (e.g., tire tread thickness). Stated in other words, the resonant frequency $f_r$ and the curve of FIG. 8 may shift to the right as the measured thickness is reduced, resulting in significant change in the parameter measured using the constant measurement frequency $f_0$.

The initial resonant frequency $f_r$ can be selected based on the nominal capacitance C of the sensor electrodes with initial/full thickness of the material (e.g., tire tread) being measured and selecting/adjusting an inductance L of the circuit (i.e., selecting an inductor) to obtain a desired initial resonant frequency according to the formula:

$f_r = 1/[\text{sqrt}(LC)]$.

Referring again to FIG. 7, a quality factor Q of the LC circuit (also referred to as a resonator) can be defined according to the formula:

$Q = f_r/(\text{FWHM})$

Q is thus inversely proportional to FWHM. Accordingly, if Q is high then the bandwidth (FWHM) of the resonator is low, or if Q is low then the bandwidth (FWHM) of the resonator is high. For a high Q resonator, small changes in capacitance may be detected along the high sensitivity region of the voltage/impedance curve using a measurement frequency $f_0$ that is slightly less than the initial resonant frequency $f_r$, but measurement sensitivity may be available over a relatively narrow range of capacitances/thicknesses. For a low Q resonator, a larger range of capacitances/thicknesses may be detected, but a sensitivity of such measurements may be relatively low. Stated in other words, there may be a tradeoff between sensitivity and range of capacitance/thickness change. Accordingly, a high Q resonator may provide relatively high sensitivity over a relatively low capacitance/thickness range, while a low Q resonator may provide relatively low sensitivity over a relatively high capacitance/thickness range.

Depending on an expected range of capacitance/thickness for a given tire, a Q value of the LC resonator circuit may be tailored to a minimally acceptable value that still preserves adequate sensitivity. For a series circuit, Q may be reduced by adding resistance R according to the following formula:

$Q_{series} = (L)(f_r)/R$.

Figure 9:
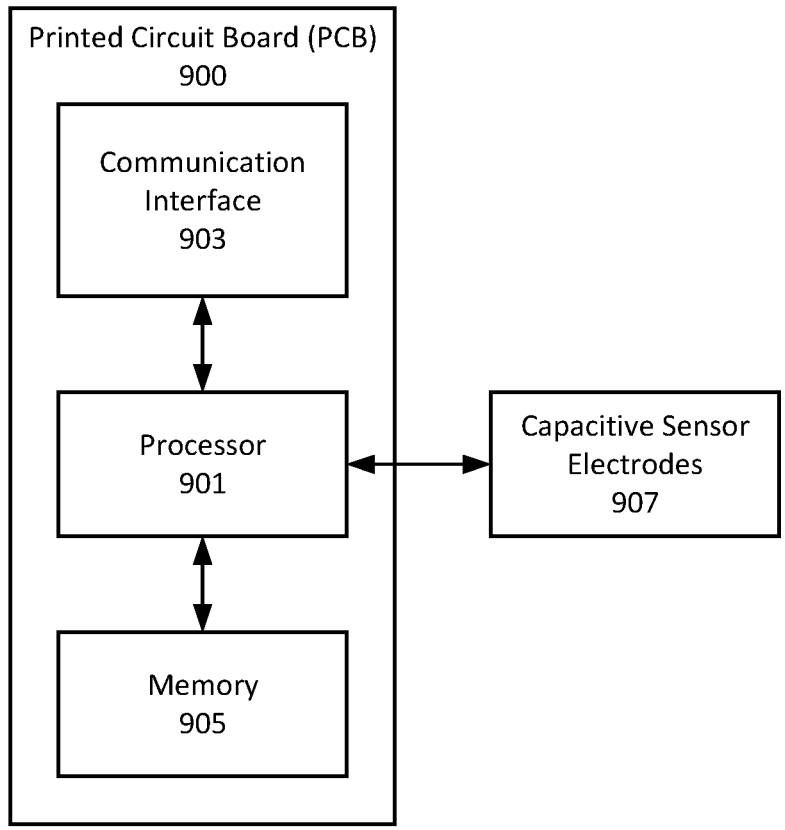
FIG. 9 is a block diagram illustrating a sensor according to some embodiments of inventive concepts.

FIG. 9 is a block diagram illustrating a elements of a sensor that can be mounted on an inner surface of a tire and used to monitor tire tread thickness according to some embodiments of inventive concepts. The sensor may include a pair of capacitor sensor electrodes 907 coupled with processor 901, and the processor 901 may be coupled with memory 905 and communication interface 903. For example, the communication interface 903, processor 901, and memory 905 (or elements thereof) may be provided on printed circuit board 900 as shown in FIG. 9. Printed circuit board 900 (including processor 901, memory 905, and communication interface 903) and capacitive sensor electrodes 907 may be provided in a package that is configured to mount to an inner surface of the tire with capacitive sensor electrodes adjacent/on the inner surface of the tire. Moreover, capacitive sensor electrodes 907 may be provided as elements of a circuit including an inductive component (e.g., an inductor), and the inductive component may be provided on PCB 900. Moreover, modules may be stored in memory 905, and these modules may provide instructions so that when instructions of a module are executed by processor 901, processor 901 performs respective operations (e.g., operations discussed below with respect to FIG. 10). In addition, communication interface 903 may provide wireless communication with a receiver to transmit information regarding thickness of the tire tread.

Figure 10:
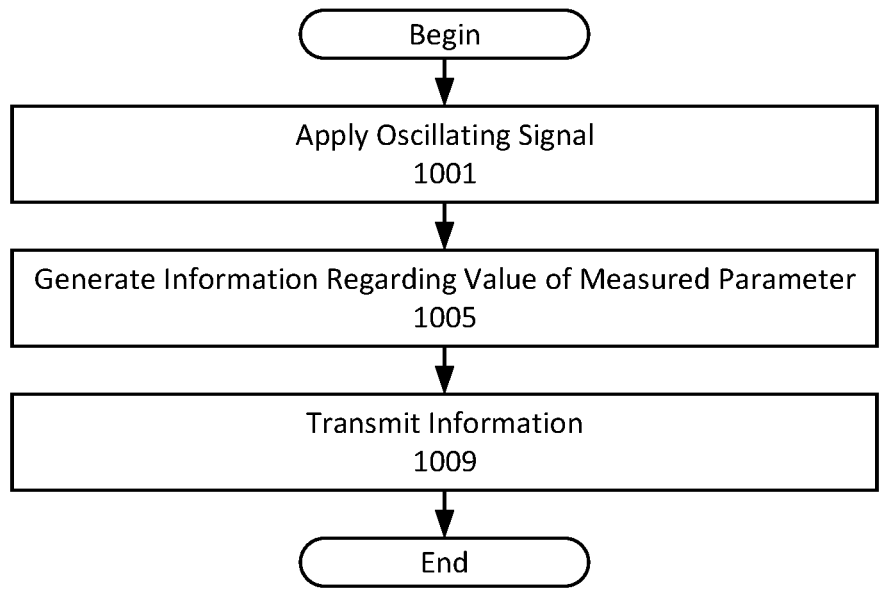
FIG. 10 is a flow chart illustrating operations of the sensor of FIG. 9 according to some embodiments of inventive concepts.

Operations of the sensor of FIG. 9 are now discussed with respect to the flow chart of FIG. 10. As discussed above, a circuit may include an inductive component (e.g., an inductor provided on PCB 900 and a capacitive component provided using a pair of capacitive sensor electrodes 907 adjacent (e.g., applied to) an inside surface of a tire opposite a tread/block (a thickness of which is to be monitored). At block 1001, processor 901 may apply an oscillating signal at a measurement frequency to the circuit including the inductive component and the capacitive component, wherein the measurement frequency is less than a resonant frequency of the circuit, and wherein the resonant frequency is based on the inductive component and the capacitive component.

The resonant frequency of the circuit may be determined based on the pair of capacitive sensor electrodes being applied to an initial thickness of the tread/block, and the measurement frequency may be determined based on a Full Width at Half Maximum of the circuit with the pair of capacitive sensor electrodes applied to the initial thickness of the tread/block. According to some embodiments, the measurement frequency may be less than the resonant frequency of the circuit and greater than the resonant frequency of the circuit minus 0.9 times a Full Width at Half Maximum (FWHM) of the circuit, wherein the FWHM is determined based on applying the pair of capacitive sensor electrodes to the initial thickness of the tread/block. For example, the measurement frequency may be greater than the resonant frequency of the circuit minus 0.5 times a Full Width at Half Maximum (FWHM) of the circuit, or the measurement frequency may be greater than the resonant frequency of the circuit minus 0.1 times a Full Width at Half Maximum (FWHM) of the circuit. Moreover, the inductive component may be provided using an inductor coupled with at least one of the capacitive sensor electrodes, and the resonant frequency may be determined based on the pair of capacitive sensor electrodes being applied to the initial thickness of the tread/block, and based on the inductor.

At block 1005, processor 901 may generate information regarding a value of a measured parameter based on applying the oscillating signal at the measurement frequency to the circuit, with the value of the measured parameter being related to the thickness of the tread and/or tread block. Generating information at block 1005, for example, may include determining a thickness of the tire tread/block based on the value of the measured parameter, or processor 901 may generate "raw" information (raw data) that is transmitted to another device to determine a thickness of the tread/block.

The measured parameter may include at least one of a voltage of the circuit, an S11 magnitude of the circuit, an S11 phase of the circuit, an impedance of the circuit, and/or a capacitance of the pair of capacitive sensor electrodes. The measured parameter, for example, may include a voltage associated with the pair of capacitive sensor electrodes. Moreover, the value of the measured parameter may be correlated with the thickness of the tread/block, so that the value of the measured parameter changes based on changes in the thickness of the material.

At block 1009, processor 901 may wirelessly transmit information regarding a thickness of the tire and/or information regarding the value of the measured parameter through communication interface 903 to a receiver (e.g., using a Bluetooth interface, a WiFi interface, or other wireless interface such as an interface operating at 315 MHz and/or 433 MHz), such as a receiver in a vehicle coupled with the tire. For example, processor 901 may wirelessly transmit information regarding the thickness and/or information regarding the value of the measured parameter. According to some embodiments, the information may be transmitted to a receiver in a vehicle coupled with the tire.

Figure 11:
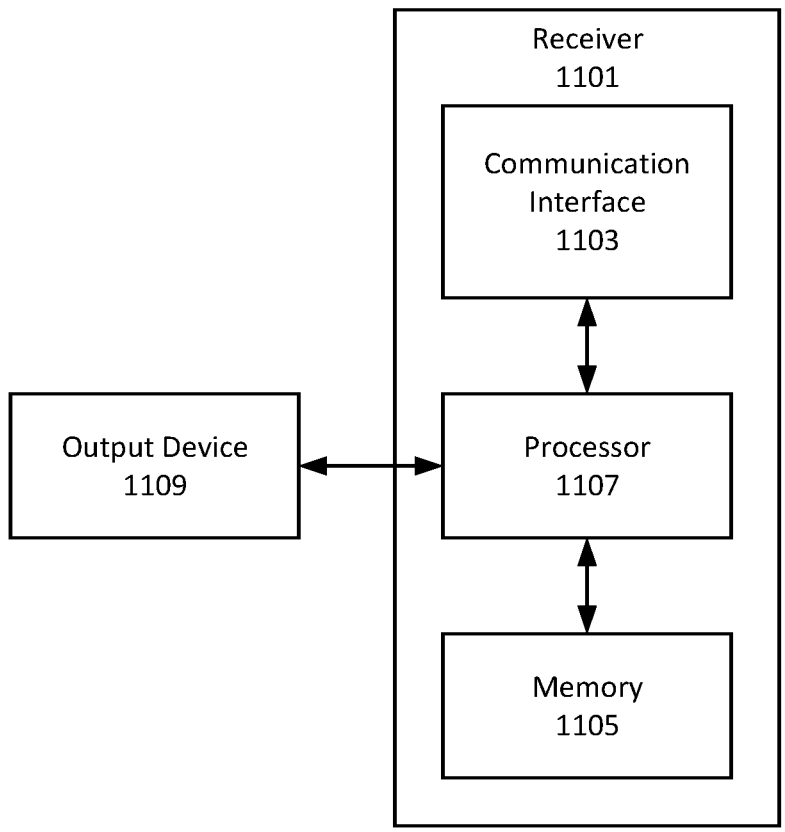
FIG. 11 is a block diagram illustrating a receiver according to some embodiments of inventive concepts.

FIG. 11 is a block diagram illustrating a elements of a receiver 1101, for example, that can be provided in a vehicle to receive information relating to tread thickness from the sensor of FIG. 9. The receiver 1101 may include processor 1107 that is coupled with communication interface 1103 and memory 1105. Processor 1107 may also be coupled with an output device 1109, such as a vehicle error diagnostics system, a vehicle processor, a vehicle dashboard warning indicator, etc. Moreover, modules may be stored in memory 1105, and these modules may provide instructions so that when instructions of a module are executed by processor 1107, processor 1107 performs respective operations (e.g., operations discussed below with respect to FIG. 12). In addition, communication interface 1103 may provide wireless communication with a transmitter (e.g., provided by communication interface 903 of FIG. 9) to receive information regarding thickness of the tire tread.

Figure 12:
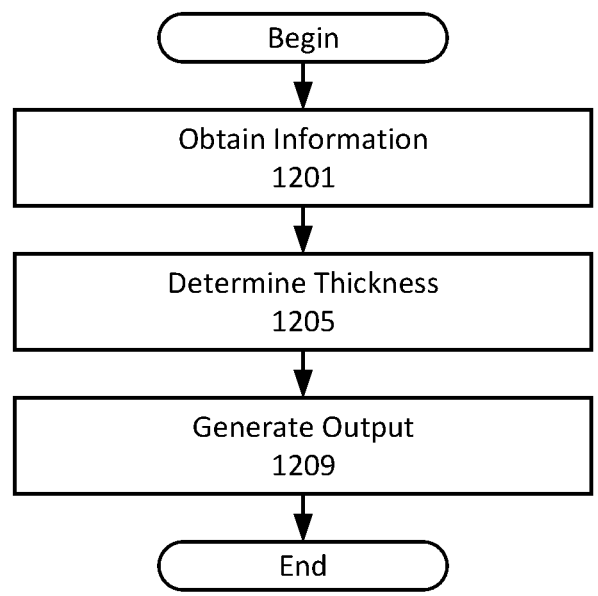
FIG. 12 is a flow chart illustrating operations of the receiver of FIG. 11 according to some embodiments of inventive concepts.

Operations of the receiver of FIG. 11 are now discussed with respect to the flow chart of FIG. 12. At block 1201, processor 1107 may obtain information regarding the value of a measured parameter, wherein the measured parameter is determined based on applying an oscillating signal at a measurement frequency to the circuit (including an inductive component and a capacitive component provided using a pair of capacitive sensor electrodes adjacent an inner surface of a tire), wherein the measurement frequency is less than a resonant frequency of the circuit, and wherein the resonant frequency is based on the inductive component and the capacitive component. For example, processor 1107 may obtain the information by wirelessly receiving the information (through communication interface 1103. e.g., over a wireless Bluetooth interface, a wireless WiFi interface, or other wireless interface such as an interface operating at 315 MHz and/or 433 MHz) from the sensor of FIG. 9. According to some other device, functionalities of the sensor and receiver of FIGS. 9 and 11 may be integrated so that one processor provides functionality of processors 901 and 1107 without requiring communication of information therebetween.

At block 1205, processor 1107 may determine a thickness of the tread/block based on the value of the measured parameter, wherein the value of the measured parameter is related to the thickness of the tread/block.

At block 1209, processor may generate an output based on the thickness of the tread/block that is provided to output device 1109. The output, for example, may be provided to a vehicle error diagnostics system, a vehicle processor, a vehicle dashboard warning indicator, etc.

Figure 13:
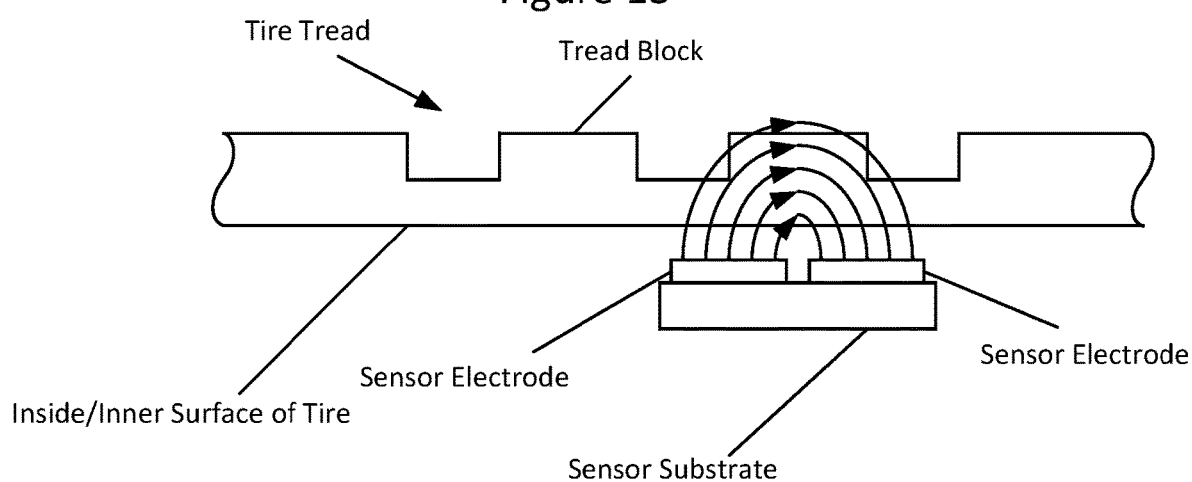
FIG. 13 is a cross sectional view illustrating a sensor on an inside surface of a tire with a magnetic field lines extending through a tread block according to some embodiments of inventive concepts.

FIG. 13 is a schematic diagrams illustrating operation of a tread wear sensor according to some embodiments of inventive concepts. In the illustration of FIG. 13, the tread wear sensor is shown on an inside surface of the tire without the other elements of FIG. 9 to more clearly illustrate operations thereof. Operation of the tread wear sensor is based on the mechanics of how electric fields interact with different materials. As shown in FIG. 13, the tread wear sensor (TWS) includes a pair of capacitive sensor electrodes (also referred to as sensor elements) side-by-side and very close to each other, and the two sensor electrodes are positioned adjacent to the inside of the tire as shown in FIG. 13.

Processor 901 may thus apply an oscillating electrical voltage to one of the sensor electrodes while the other sensor electrode is grounded to generate an electrical field between the two sensor electrodes (shown as arcs in FIG. 13). While most of the electric field may pass directly between edges of the sensor electrodes, some of the electric field arcs from the face of one electrode to the face of the other electrode through the tire tread (shown by arcs in FIG. 13). The tire rubber and tread structure interfere with this "fringing field," and by measuring this interference through the electrical response of the grounded sensor element, processor 901 may thus determine a thickness of the tire adjacent the capacitive sensor electrodes.

Figure 14:
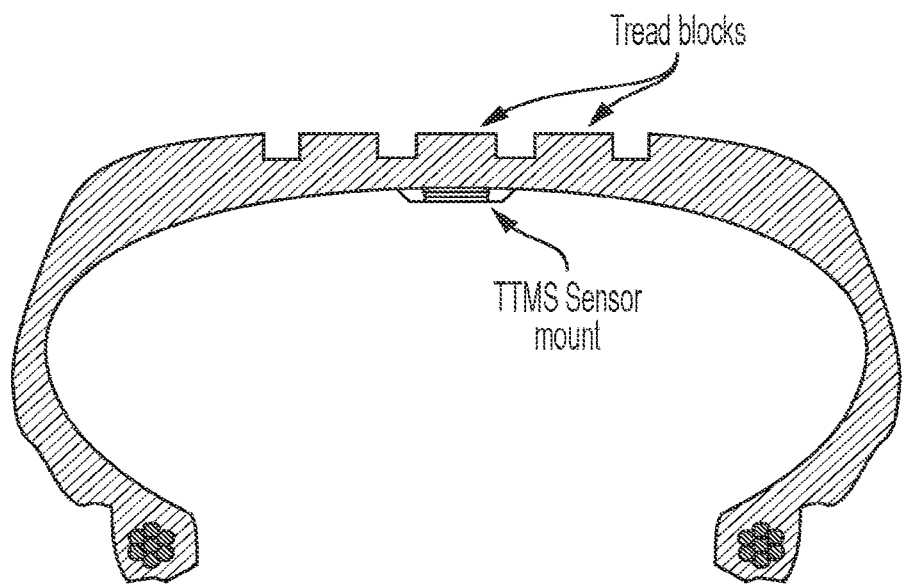
FIG. 14 is a cross sectional view illustrating a sensor housing mounted on an inside surface of a time according to some embodiments of inventive concepts.

FIG. 14 is a cross-sectional view of a tire tread monitoring system (TTMS) sensor housing (sometimes referred to herein as a TTMS sensor mount) mounted on an inside surface of a tire according to some embodiments of inventive concepts. The TTMS sensor housing of FIG. 14 may include capacitive sensor electrodes 907, processor 901, memory 905, and communication interface 903.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore. "coupled". "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has". "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est." may be used to specify a particular item from a more general recitation.

The dimensions of elements in the drawings may be exaggerated for the sake of clarity. Further, it will be understood that when an element is referred to as being "on" another element, the element may be directly on the other element, or there may be an intervening element therebetween. Moreover, terms such as "top," "bottom," "upper," "lower," "above," "below." and the like are used herein to describe the relative positions of elements or features as shown in the figures. For example, when an upper part of a drawing is referred to as a "top" and a lower part of a drawing is referred to as a "bottom" for the sake of convenience, in practice, the "top" may also be called a "bottom" and the "bottom" may also be a "top" without departing from the teachings of the inventive concept (e.g., if the structure is rotated 180 degrees relative to the orientation of the figure).

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor (also referred to as a controller) such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following claims and their equivalents, and shall not be restricted or limited by the foregoing detailed description.

The invention claimed is:

1. A method of measuring a thickness of a material, the method comprising:
    applying an oscillating signal at a measurement frequency to a circuit including an inductive component and a capacitive component provided using a pair of capacitive sensor electrodes adjacent the material, the measurement frequency being less than a resonant frequency of the circuit, and the resonant frequency being based on the inductive component and the capacitive component; and
    generating information regarding a value of a measured parameter based on applying the oscillating signal at the measurement frequency to the circuit, the value of the measured parameter being related to the thickness of the material.

2. The method of claim 1, wherein the resonant frequency of the circuit is determined based on the pair of capacitive sensor electrodes being applied to an initial thickness of the material.

3. The method of claim 2, wherein the measurement frequency is determined based on a Full Width at Half Maximum ("FWHM") bandwidth of the circuit with the pair of capacitive sensor electrodes applied to the initial thickness of the material.

4. The method of claim 2, wherein the measurement frequency is less than the resonant frequency of the circuit and greater than the resonant frequency of the circuit minus 0.9 times a Full Width at Half Maximum ("FWHM") bandwidth of the circuit, the FWHM bandwidth being determined based on applying the pair of capacitive sensor electrodes to the initial thickness of the material.

5. The method of claim 4, wherein the measurement frequency is greater than the resonant frequency of the circuit minus 0.5 times the FWHM bandwidth of the circuit.

6. The method of claim 4, wherein the measurement frequency is greater than the resonant frequency of the circuit minus 0.1 times the FWHM bandwidth of the circuit.

7. The method of claim 2, wherein the inductive component is provided using an inductor coupled with at least one of the pair of capacitive sensor electrodes, and
    wherein the resonant frequency is determined based on the pair of capacitive sensor electrodes being applied to the initial thickness of the material, and based on the inductor.

8. The method of claim 1, wherein the measured parameter comprises at least one of:
    a voltage of the circuit;
    a magnitude of the reflected signal ("S11") detected at the circuit;
    a phase of the S11 detected at phase of the circuit;
    an impedance of the circuit; and
    a capacitance of the pair of capacitive sensor electrodes.

9. The method of claim 8, wherein the measured parameter comprises a voltage associated with the pair of capacitive sensor electrodes.

10. The method of claim 1, wherein the material comprises a tire tread of a tire, and
    wherein the pair of capacitive sensor electrodes are applied to an inner surface of the tire opposite the tire tread.

11. The method of claim 10 further comprising:
    determining the thickness of the material based on the value of the measured parameter.

12. The method of claim 11 further comprising:
    wirelessly transmitting information associated with the thickness of the material to a receiver via wireless interface.

13. The method of claim 12, wherein wirelessly transmitting comprises wirelessly transmitting over a wireless interface and/or over a short-range wireless interface to the receiver.

14. The method of claim 12, wherein the receiver is in a vehicle coupled with the tire.

15. The method of claim 10 further comprising:
    wirelessly transmitting the information regarding the value of the measured parameter over a wireless interface to a receiver.

16. The method of claim 1, wherein the value of the measured parameter is correlated with the thickness of the material, so that the value of the measured parameter changes based on changes in the thickness of the material.

17. A method of measuring a thickness of a material using a circuit including an inductive component and a capacitive component provided using a pair of capacitive sensor electrodes adjacent the material, the method comprising:
    obtaining information regarding a value of a measured parameter, the measured parameter being determined based on applying an oscillating signal at a measurement frequency to the circuit, the measurement frequency being less than a resonant frequency of the circuit, and the resonant frequency being based on the inductive component and the capacitive component; and determining the thickness of the material based on the value of the measured parameter, the value of the measured parameter being related to the thickness of the material.

18. The method of claim 17, wherein the resonant frequency of the circuit is determined based on the pair of capacitive sensor electrodes being applied to an initial thickness of the material.

19. The method of claim 18, wherein the measurement frequency is determined based on a Full Width at Half Maximum ("FWHM") of the circuit with the pair of capacitive sensor electrodes applied to the initial thickness of the material.

20. The method of claim 18, wherein the measurement frequency is less than the resonant frequency of the circuit and greater than the resonant frequency of the circuit minus 0.9 times a Full Width at Half Maximum ("FWHM") bandwidth of the circuit, the FWHM bandwidth being determined based on applying the pair of capacitive sensor electrodes to the initial thickness of the material.

* * * * *